(12) United States Patent
Wang et al.

(10) Patent No.: US 10,995,736 B2
(45) Date of Patent: May 4, 2021

(54) METHOD, APPARATUS AND SYSTEM FOR DETECTING FATIGUE STATE OF COG BELT OF WIND POWER GENERATOR SET

(71) Applicant: BEIJING GOLDWIND SCIENCE & CREATION WINDPOWER EQUIPMENT CO., LTD., Beijing (CN)

(72) Inventors: Qingtian Wang, Beijing (CN); Jie Zhou, Beijing (CN); Tao Sun, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 234 days.

(21) Appl. No.: 15/741,802

(22) PCT Filed: Jun. 9, 2017

(86) PCT No.: PCT/CN2017/087646
§ 371 (c)(1),
(2) Date: Jan. 4, 2018

(87) PCT Pub. No.: WO2018/014670
PCT Pub. Date: Jan. 25, 2018

(65) Prior Publication Data
US 2019/0003460 A1    Jan. 3, 2019

(30) Foreign Application Priority Data

Jul. 18, 2016    (CN) .......................... 201610566387.6

(51) Int. Cl.
*F03D 17/00*    (2016.01)
*F03D 7/02*    (2006.01)
(Continued)

(52) U.S. Cl.
CPC ........... *F03D 17/00* (2016.05); *F03D 7/0224* (2013.01); *F16H 57/01* (2013.01); *G01M 13/023* (2013.01);
(Continued)

(58) Field of Classification Search
CPC ...... F03D 17/00; F16H 57/01; G01M 13/023; F05B 2260/4021; F05B 2260/80; F05B 2260/4031
See application file for complete search history.

(56) References Cited

U.S. PATENT DOCUMENTS 4,502,042 A * 2/1985 Wuhrl .................... G01V 3/102
340/561
6,249,726 B1 * 6/2001 Burke, II ............. B60H 1/3225
192/150
(Continued)

FOREIGN PATENT DOCUMENTS

CN    101245765 A    8/2008
CN    101660493 A    3/2010
(Continued)

OTHER PUBLICATIONS

International Search Report issued by the State Intellectual Property Office of People's Republic of China for International Application No. PCT/CN2017/087646, dated Sep. 12, 2017.
(Continued)

*Primary Examiner* — Matthew G Marini
(74) *Attorney, Agent, or Firm* — Finnegan, Henderson, Farabow, Garrett & Dunner, LLP

(57) ABSTRACT

A method for detecting fatigue state of cog belt of wind power generator set is provided, including acquiring pitch angles satisfying preset condition, acquiring signal characteristic values corresponding to the pitch angles, selects from the pitch angles according to acquisition timing
(Continued)

sequence of signal characteristic values pitch angles at which signal characteristic value changes, performing characteristic statistics on selected pitch angles to acquire characteristic statistic value and determining whether the cog belt is in fatigue state by comparing characteristic statistic value with predetermined threshold.

13 Claims, 5 Drawing Sheets

(51) Int. Cl.
*F16H 57/01* (2012.01)
*G01M 13/023* (2019.01)

(52) U.S. Cl.
CPC ............... *F05B 2260/4021* (2013.01); *F05B 2260/4031* (2013.01); *F05B 2260/79* (2013.01); *F05B 2260/80* (2013.01); *F16H 2057/012* (2013.01)

(56) References Cited

U.S. PATENT DOCUMENTS

| | | | |
|---|---|---|---|
| 2007/0057517 A1 | 3/2007 | McNerney | |
| 2011/0014047 A1 | 1/2011 | Mascioni et al. | |
| 2011/0158805 A1 | 6/2011 | Miranda et al. | |
| 2011/0286843 A1 | 11/2011 | Lengl et al. | |
| 2012/0180314 A1 | 7/2012 | Axelsson et al. | |
| 2012/0230820 A1 | 9/2012 | Frydendal et al. | |
| 2015/0147172 A1* | 5/2015 | Chacon | F03D 7/0224 416/1 |
| 2015/0176570 A1 | 6/2015 | Egedal et al. | |
| 2015/0292483 A1 | 10/2015 | Slack et al. | |
| 2016/0053745 A1* | 2/2016 | Blom | F03D 7/045 416/1 |
| 2016/0186722 A1 | 6/2016 | Olesen | |
| 2016/0237988 A1* | 8/2016 | Perley | F03D 7/0288 |
| 2016/0330225 A1* | 11/2016 | Kroyzer | G06F 21/552 |

FOREIGN PATENT DOCUMENTS

| | | |
|---|---|---|
| CN | 102678453 A | 9/2012 |
| CN | 103063425 A | 4/2013 |
| CN | 103742362 A | 4/2014 |
| CN | 104196679 A | 12/2014 |
| CN | 105257471 A | 1/2016 |
| CN | 105408625 A | 3/2016 |
| EP | 2933477 A1 | 10/2015 |
| WO | WO 2015/014366 A1 | 2/2015 |

OTHER PUBLICATIONS

Translation Australian Office Action issued in counterpart Australian Patent Application No. 2017279622, dated Jun. 18, 2018.
Extended European Search Report issued in corresponding European Patent Application No. 17811425.2, dated Feb. 13, 2019.
Chinese Office Action issued in counterpart Chinese Patent Application No. 201710102756.0, dated Jul. 27, 2018.

* cited by examiner

METHOD, APPARATUS AND SYSTEM FOR DETECTING FATIGUE STATE OF COG BELT OF WIND POWER GENERATOR SET

The present disclosure is a national phase of international application No. PCT/CN2017/087646 which claims the priority to Chinese Patent Application No. 201610566387.6, titled "METHOD, APPARATUS AND SYSTEM FOR DETECTING FATIGUE STATE OF COG BELT OF WIND POWER GENERATOR SET", filed on Jul. 18, 2016 with the State Intellectual Property Office of People's Republic of China, the content of which are all incorporated herein by reference.

TECHNICAL FIELD

The present disclosure relates to the technical field of wind power generation, and in particular, to a method, an apparatus and a system for detecting a fatigue state of a cog belt of a wind power generator set.

BACKGROUND

The wind power generator set can transfer wind energy into electric energy to generate electric power. When the set reaches a state of full capacity, pitch varying is required to achieve constant rotation speed control. In the pitch varying, a pitch varying system drives a cog belt via a pitch varying motor to drive a pitch varying bearing so as to change an angle of a blade to wind, and achieve the pitch varying.

The cog belt serves as a drive mechanism of the pitch varying system of the wind power generator set, and bears very serious fatigue load and alternating load under long term pitch varying requirement of the set. If the cog belt breaks or fails, the blade will be out of control, thereby threatening security of the set gravely. Therefore, the cog belt is required to be detected, so as to warn early about risks before the cog belt breaks or fails, ensuring secure operations of the set.

SUMMARY

In view of the above, a method for detecting a fatigue state of a cog belt of a wind power generator set is provided according to the present disclosure, to detect the fatigue state of the cog belt in service at low cost. In addition, an apparatus and a system for detecting a fatigue state of a cog belt of a wind power generator set are further provided according to the present disclosure, so as to ensure application and implementation of the method in practice.

Technical solutions provided according to the present disclosure are as follows.

A method for detecting a fatigue state of a cog belt of a wind power generator set is provided, including:
acquiring pitch angles satisfying a preset condition;
acquiring signal characteristic values corresponding to the pitch angles;
selecting, from the pitch angles, pitch angles at which the signal characteristic value changes, according to an acquisition timing sequence of the signal characteristic values;
performing characteristic statistics on the selected pitch angles to acquire a characteristic statistic value; and
determining whether the cog belt is in the fatigue state, by comparing the characteristic statistic value with a predetermined threshold.

An apparatus for detecting a fatigue state of a cog belt of a wind power generator set is provided, including:
a pitch angle acquisition unit, configured to acquire pitch angles satisfying a preset condition;
a signal characteristic value acquisition unit, configured to acquire signal characteristic values corresponding to the pitch angles;
a characteristic statistic value calculation unit, configured to select, from the pitch angles, pitch angles at which the signal characteristic value changes, according to an acquisition timing sequence of the signal characteristic values, and perform characteristic statistics on the selected pitch angles to acquire a characteristic statistic value; and
a fatigue determination unit, configured to determine whether the cog belt is in the fatigue state, by comparing the characteristic statistic value with a predetermined threshold.

A system for detecting a fatigue state of a cog belt of a wind power generator set is provided, including a sensor, a proximity switch, and any one of the above apparatus for detecting the fatigue state of the cog belt of the wind power generator set, where
the sensor is configured to send pitch angles detected in real time to any one of the above apparatus for detecting the fatigue state of the cog belt of the wind power generator set; and
the proximity switch is configured to feed back the signal characteristic values corresponding to the pitch angles satisfying the preset condition, to any one of the above apparatus for detecting the fatigue state of the cog belt of the wind power generator set.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF THE EMBODIMENTS

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

When a wind power generator set (may be abbreviated as a set) is required to vary pitch, a pitch varying system drives a cog belt via a pitch varying motor to drive a pitch varying bearing, so as to change an angle of a blade to wind, and achieve pitch varying.

The cog belt has a risk to break or fail under a fatigue state resulting from long term operation. A method for detecting the fatigue state of the cog belt of the wind power generator set, provided according to the present disclosure, is configured to detect the fatigue state of the cog belt in operation.

The fatigue state of the cog belt may be a fatigue abrasion of a meshing tooth of the cog belt, a change in length of the cog belt under long term operation, a change in tension of the cog belt under long term operation. It is understood that, the fatigue state of the cog belt in the present disclosure is not limited to the above manifestations.

Figure 1:
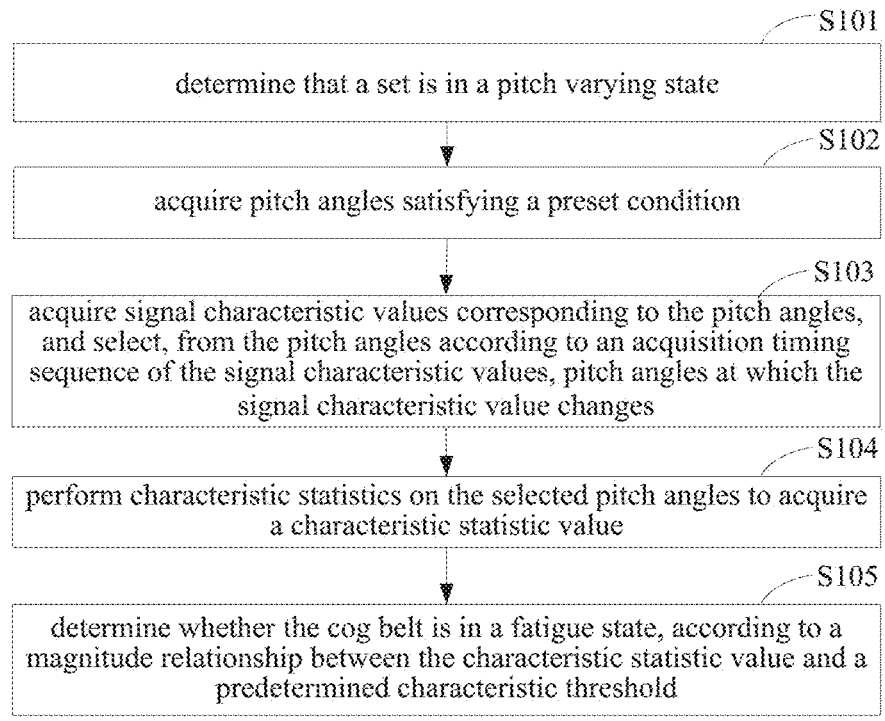
FIG. 1 is a flowchart of a first embodiment of a method for detecting a fatigue state of a cog belt of a wind power generator set according to the present disclosure.

FIG. 1 shows a flowchart of a first embodiment of a method for detecting a fatigue state of a cog belt of a wind power generator set. As shown in FIG. 1, an embodiment includes step S101 to step S105.

In step S101, it is determined that the set is in a pitch varying state.

Whether the set is in the pitch varying state is determined according to an operation state parameter of the set. Step S102 is then performed if the set is in the pitch varying state.

Specifically, the operation state parameter of the set may be a pitch angle, namely, it is determined whether the current pitch angle of the set is greater than a predetermined minimum pitch angle. In response to a positive determination, the set is determined to be in the pitch varying state. It is understood that other technical solutions may be applied to determine whether the set is in the pitch varying state, not limited to the pitch angle.

In step 102, pitch angles satisfying a preset condition are acquired.

In a case that the set is in the pitch varying state, a group of the pitch angles of the set is acquired. For example, the pitch angles are collected per second, and 100 pitch angles are acquired by collecting 100 times.

Pitch angles satisfying a preset condition are extracted from the group of the pitch angles. Specifically, the preset condition may be a range of the pitch angle, such as [3.5, 6.5] deg (degree of angle). The range of the pitch angle may be determined from an operation range of a proximity switch in step S103. Thereby, pitch angles within the range of the pitch angle are extracted from the group of the pitch angles, and these pitch angles are the pitch angles satisfying the preset condition.

It is understood that other ranges of the pitch angle may be applied, not limited to the above.

In step S103, signal characteristic values corresponding to the pitch angles are acquired, and pitch angles at which the signal characteristic value changes are selected from the pitch angles according to an acquisition timing sequence of the signal characteristic values.

The generator set is provided with a proximity switch. Before implementation, the operation range of the proximity switch, namely, the range of the pitch angle at which a level signal is fed back, may be set. It is assumed that the range of the pitch angle is set to be [A, B] in a practical application, and the proximity switch senses, in a physical manner, whether the pitch angle is within the range. If the pitch angle is within the range, the proximity switch is turned on and feeds back the level signal corresponding to the pitch angle; and if the pitch angle is out of the range, the proximity switch no longer feeds back the level signal. The level signal fed back by the proximity switch may be understood as a form of the signal characteristic value.

Figure 2:
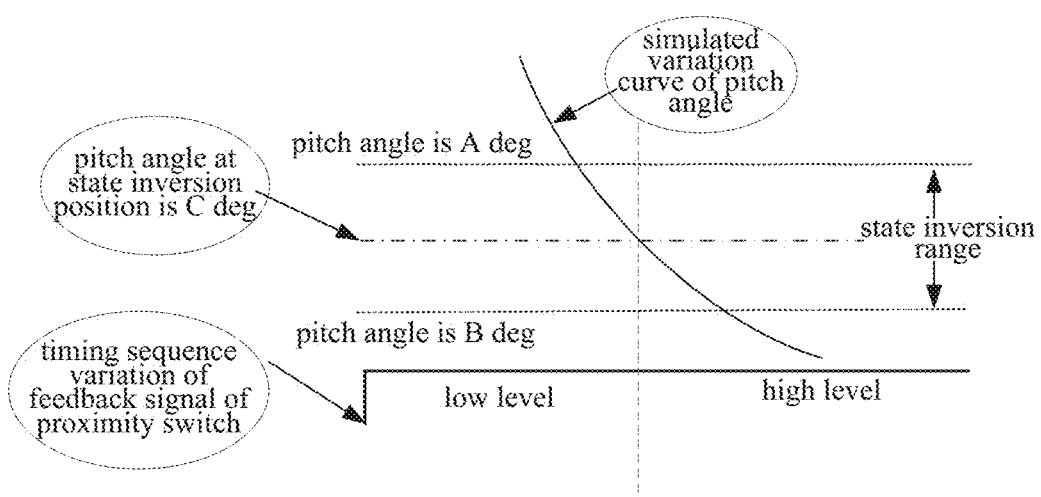
FIG. 2 is a schematic diagram of a level signal fed back by a proximity switch provided according to the present disclosure.

The level signal fed back by the proximity switch is as shown in FIG. 2.

In FIG. 2, the range of the pitch angle is set to be [A, B], and a relationship among degrees A, B and C of the pitch angles is A>C>B, where C is an inversion angle (the pitch angle at which the signal fed back by the proximity switch changes), namely, in a case that the pitch angle is smaller than A and greater than C, the signal fed back by the proximity switch is a low level, and in a case that the pitch angle is smaller than C and greater than B, the signal fed back by the proximity switch is a high level. Therefore, when the pitch angle changes from A deg to B deg, the signal fed back by the proximity switch changes from the low level to the high level when the angle reaches C. Conversely, when the pitch angle changes from B deg to A deg, the signal fed back by the proximity switch changes from the high level to the low level.

Considering an error of adjustment, the pitch angles close to C are the pitch angles satisfying the requirement. For example, the pitch angles within a range C±0.5 deg all satisfy the requirement. From FIG. 2, it can be seen that the pitch angle within the range [A, B] deg has a corresponding range of the feedback signal where the range of the feedback signal may be called as a state inversion range, and the range can be understood as the range C±0.5 deg.

Under a normal operation state, the inversion angle of the pitch angle is fixed, such as C±0.5 deg, excluding an influence of the proximity switch itself and other influences of connection wires. It is understood that the fixed values may be different for different sets. However, in practical operation, the cog belt may deform due to long term fatigue load and alternating load, and in such case, the inversion angle drifts.

Figure 3A:
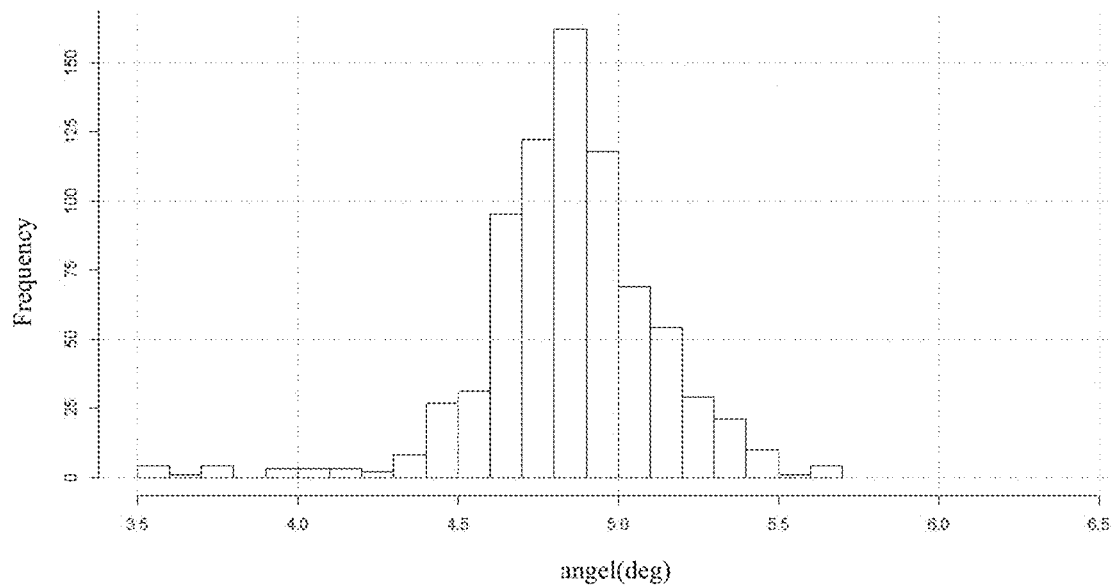
FIG. 3A is a schematic diagram of a distribution of inversion angles among pitch angles under an abnormal state provided according to the present disclosure.
Figure 3B:
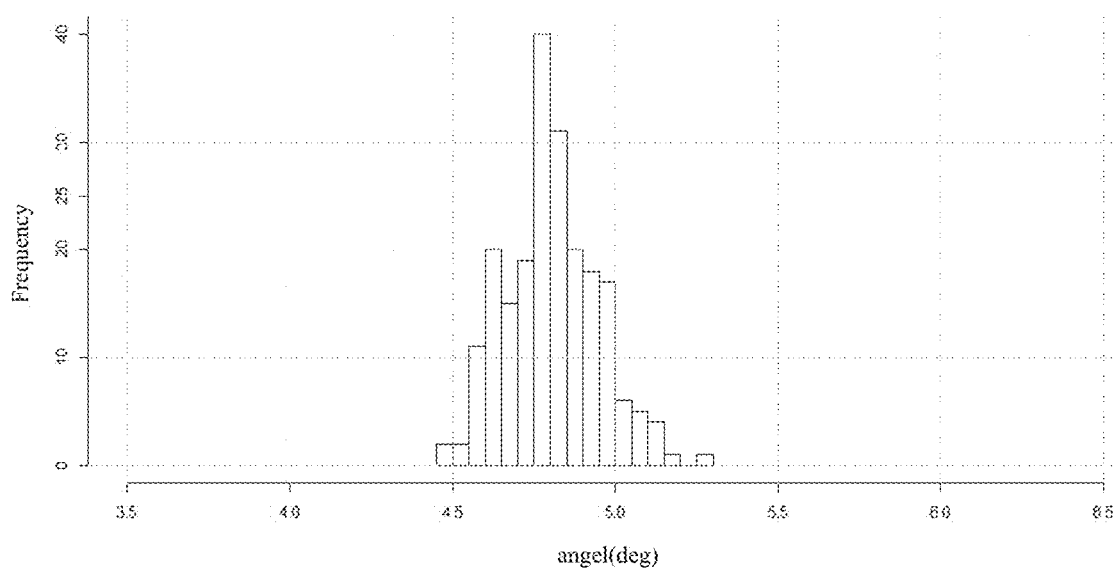
FIG. 3B is a schematic diagram of a distribution of inversion angles among pitch angles under a normal state provided according to the present disclosure.

Shown in FIG. 3A and FIG. 3B are distributions of the inversion angles among the pitch angles, under an abnormal state and a normal state, respectively. From a comparison between FIG. 3A and FIG. 3B, it can be seen that, under the abnormal state, fluctuation of the pitch angles corresponding to the inversion angles among the pitch angles is larger, namely, there exist situations that the signal fed back by the proximity switch changes out of the range 5±0.5 deg.

Therefore, the fatigue state of the cog belt may be detected via a relationship between the signal fed back by the proximity switch and the pitch angle.

Specifically, when acquiring the pitch angles in the above steps, the signals fed back by the proximity switch, corresponding to the pitch angles, can be acquired correspondingly. The signal fed back by the proximity switch is a digital value fed back by hardware, where there are only two states, 0 and 1, representing the low level and the high level respectively. The signal fed back by the proximity switch is a form of the signal characteristic value corresponding to the pitch angle.

The signal fed back by the proximity switch and the pitch angle are synchronous in the timing sequence, namely, the pitch angle at a time corresponds to the signal fed back by the proximity switch at that time. Namely, with the correspondence, the feedback signal at a time can be found via the pitch angle at that time within the range [A, B], or the pitch angle at a time within the range [A, B] can be found via the corresponding feedback signal at that time. However, the correspondence cannot be used in a case that the pitch angle is out of the range [A, B], because the proximity switch only feeds back the signal when the pitch angle is within the range [A, B]. Therefore, the pitch angles satisfying the preset condition, acquired in the step S102, have the corresponding signals fed back by the proximity switch.

The pitch angles satisfying the preset condition are multiple, then the signals fed back by the proximity switch are multiple, and the signals fed back by the proximity switch are sequenced according to the timing sequence (a temporal order of feeding back the signals). According to the timing sequence of the multiple signals fed back by the proximity switch, whether the signal fed back by the proximity switch changes may be determined. Then according to signal feedback times of the changing signals fed back by the proximity switch and the above correspondence on the timing sequence, the pitch angles corresponding to the changing signals fed back by the proximity switch can be found from the pitch angles satisfying the preset condition acquired in the step S102.

For example, a group of the signals fed back by the proximity switch is 1001011, including four changing signals fed back by the proximity switch, namely, 0 at the second bit, 1 at the fourth bit, 0 at the fifth bit, and 1 at the sixth bit. The pitch angles corresponding to the group of the signals 1001011 fed back by the proximity switch are respectively: 5.3, 5.0, 4.7, 6.3, 4.2, 5.7 and 5.5. Therefore, according to the changing signals fed back by the proximity switch, the selected pitch angles are 5.0, 6.3, 4.2 and 5.7.

In step S104, characteristic statistics is performed on the selected pitch angles, and a characteristic statistic value is acquired.

In a practical application, the characteristic statistics may be measuring, for example, a mean value of the selected pitch angles, a standard deviation of the selected pitch angles, or a difference value between a largest value and a smallest value among the selected pitch angles. It is understood that the characteristic statistics may be in other forms, not limited to the above.

Figure 4A:
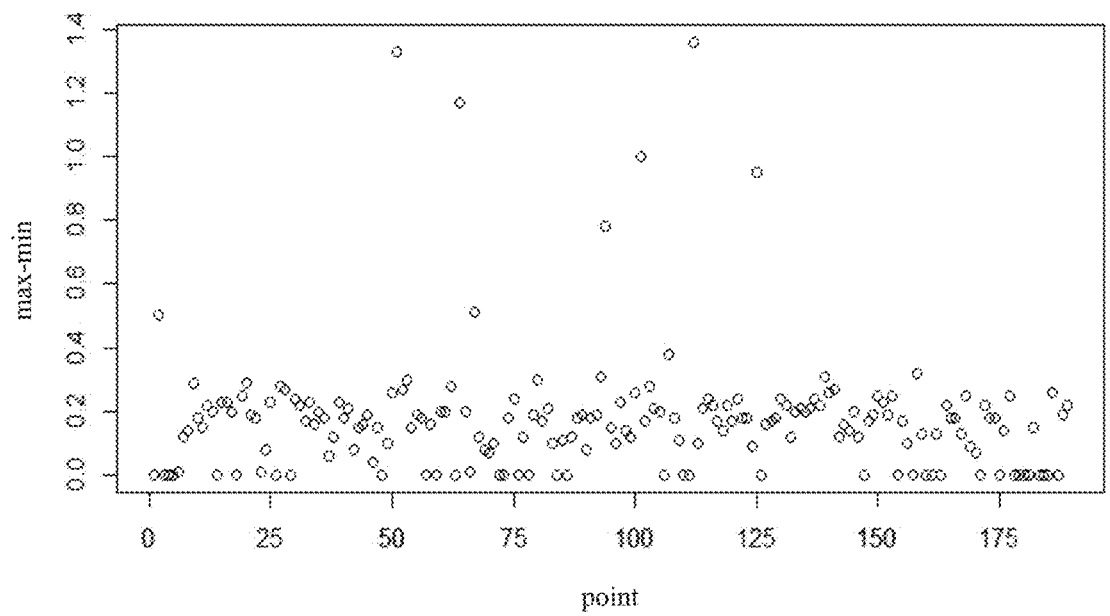
FIG. 4A is a schematic diagram of a distribution of difference values between a largest value and a smallest value among pitch angles under an abnormal state provided according to the present disclosure.
Figure 4B:
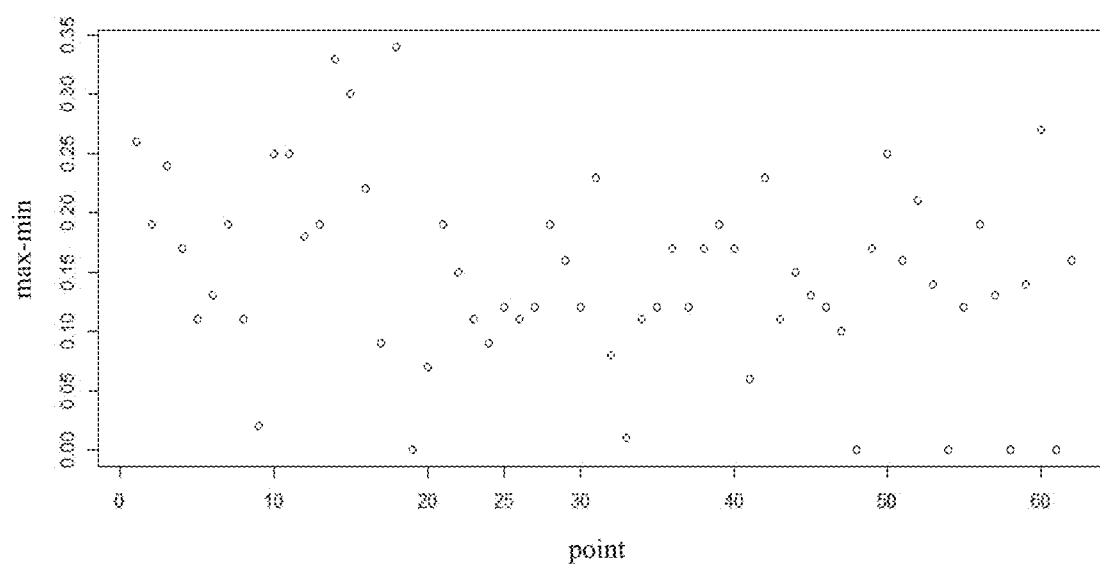
FIG. 4B is a schematic diagram of a distribution of difference values between a largest value and a smallest value among pitch angles under a normal state provided according to the present disclosure.

Shown in FIG. 4A is a statistic result of the difference value between the largest value and the smallest value under an abnormal state, and shown in FIG. 4B is a statistic result of the difference value between the largest value and the smallest value under a normal state.

In step S105, it is determined whether the cog belt is in the fatigue state, according to a magnitude relationship between the characteristic statistic value and a predetermined characteristic threshold.

The manner of the characteristic statistics in the step S104 corresponds to the predetermined characteristic threshold (may be abbreviated as predetermined threshold). For example, if the characteristic statistics is measuring the standard deviation, the predetermined characteristic threshold is the predetermined threshold corresponding to the standard deviation. If the characteristic statistics is measuring the difference value between the largest value and the smallest value, the predetermined characteristic threshold is the predetermined threshold corresponding to the difference value between the largest value and the smallest value. If the characteristic statistics is measuring the mean value, the predetermined characteristic threshold is the predetermined threshold corresponding to the mean value.

In a case that the characteristic statistic value is greater than the predetermined characteristic threshold, it may be determined that the cog belt is in the fatigue state, and in a case that the characteristic statistic value is smaller than or equal to the predetermined characteristic threshold, it may be determined that the cog belt is not in the fatigue state. It is understood that the above may also hold vice versa, based on a practical situation.

From the above technical solution, the method for detecting the fatigue state of the cog belt of the wind power generator set is provided according to an embodiment. In the method, the pitch angles satisfying the preset condition are acquired, the signal characteristic values corresponding to the pitch angles are acquired, the pitch angles at which the signal characteristic value changes are selected from the pitch angles according to the acquisition timing sequence of the signal characteristic values, the characteristic statistics is performed on the selected pitch angles to acquire the characteristic statistic value, and whether the cog belt is in the fatigue stated is determined by comparing the characteristic statistic value and the predetermined threshold. According to the method, detection of the fatigue state of the cog belt can be achieved without any auxiliary detection device or hardware measure, which has a better real-time performance and lower cost. In addition the method is easy to be achieved and has an algorithm with low complexity, thus having better applicability.

If it is detected that the cog belt has a high risk being in the fatigue state, an alarm signal is outputted to issue a danger prompt, to provide a reference for a maintainer to perform check and maintenance, prevents an unpredictable influence, of an uncontrolled blade on the set, resulting from a failed cog belt, and ensures normal operation of the set.

In the above step S105, the predetermined characteristic threshold many be a threshold corresponding to the standard deviation or a threshold corresponding to the largest value and the smallest value among the pitch angles. In a practical application, the two types of the threshold are empirical values, namely, summarized based on pitch variation situations of the set. Therefore, when characteristic statistics is performed on the selected pitch angles in the step S104, the standard deviation or the difference value between the largest value and smallest value among the pitch angles may be measured.

However, there is a case that the mean value of the selected pitch angles is measured in performing the characteristic statistics on the selected pitch angles in the step S104. Because the adjustment and installation of the proximity switch are influenced by human factors in a practical application, the inversion angles among the pitch angles are not unique. Therefore, the mean value of the selected pitch angles can be calculated adaptively according to the step S101 to the step S104, and then the mean value is used to generate the predetermined characteristic value.

That is, after the mean value of the pitch angles is selected, the mean value or the mean value being added and subtracted with a value, serves as a range of the mean value (i.e., a predetermined characteristic threshold). For example, the mean value of the selected pitch angles is 5 deg and by adding and subtracting 0.3 on the basis of 5 deg, the acquired range of the mean value is [4.7, 5.3] deg. The range of the mean value serves as a following determination standard to determine whether the cog belt is in the fatigue state.

A manner of determination is comparing the pitch angle with the range of the mean value after the pitch angle is selected. The pitch angle is determined to be in the fatigue state if the pitch angle is out of the range of the mean value, and the pitch angle is determined to be not in the fatigue state if the pitch angle is within the range of the mean value.

The above selected pitch angles may be saved in a recording file, to provide a data storage for following improvement of the set. It is understood that other data may also be saved in the recording file.

Figure 5:
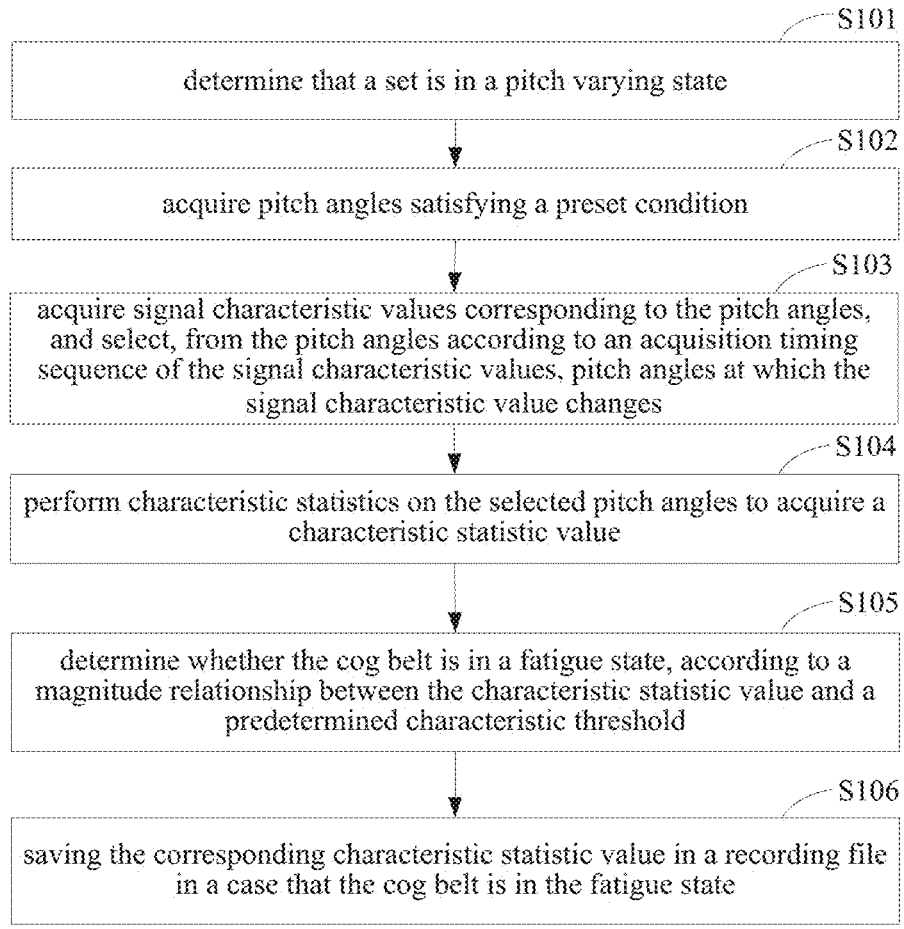
FIG. 5 is a flowchart of a second embodiment of a method for detecting a fatigue state of a cog belt of a wind power generator set according to the present disclosure.

Shown in FIG. 5 is a flowchart of a second embodiment of a method for detecting a fatigue state of a cog belt of a wind power generator set provided according to the present disclosure. As shown in FIG. 5, compared with the first embodiment of the method for detecting the fatigue state of the cog belt of the wind power generator set, the second embodiment differs in that step S106 is added. Hereinafter only the step S106 is illustrated, and the other steps can refer to the illustrations of the first embodiment and are not further described in details here.

In step S101, it is determined that the set is in a pitch varying state.

In step S102, pitch angles satisfying a preset condition are acquired.

In step S103, the signal characteristic values corresponding to the pitch angles are acquired, and the pitch angles at which the signal characteristic value changes are selected from the pitch angles according to an acquisition timing sequence of the signal characteristic values.

In step S104, characteristic statistics is performed on the selected pitch angles, and a characteristic statistic value is acquired.

In step S105, it is determined whether the cog belt is in the fatigue state, according to a magnitude relationship between the characteristic statistic value and a predetermined characteristic threshold.

In step S106, the corresponding characteristic statistic value is saved in a recording file, in a case that the cog belt is in the fatigue state.

In an example, the set in the pitch varying state may perform step S102 to step S104 for multiple times to acquire the characteristic statistic values at different detection time points, and cache the characteristic statistic value each time the characteristic statistic value is acquired. If a data volume of the cached characteristic statistic values reaches a predetermined cache threshold, the cached characteristic statistic values may be outputted into a file and saved, where the file may be called the recording file. In addition, original data of the pitch angles, namely, the pitch angles in the step S102, may be further saved in the recording file.

In another example, if the cog belt is in the fatigue state, the characteristic statistic value of the cog belt in the fatigue state is saved in the recording file.

The recording file may evaluate a fatigue performance of the cog belt in practical operation, so as to provide data storage for following improvement.

The above methods for detecting the fatigue state of the cog belt of the wind power generator set are solutions aiming at one certain cog belt, namely, the acquired pitch angles satisfying the preset condition are the pitch angles of one cog belt, and the fatigue state of the cog belt is acquired after analyzing the pitch angles.

However, it may be further determined whether there is a fatigue cog belt in multiple cog belts according to a relationship among the pitch angles of the multiple cog belts.

Specifically, under a normal state, execution results, namely, the actual pitch angles, of the multiple cog belts should be the same under a same pitch varying requirement. Therefore, fatigue conditions of the cog belts may be determined via statistics on following conditions of the multiple pitch angles under the pitch varying state, where the pitch varying state may include a startup process, a process from no pitch variation to pitch variation, and a state of long term pitch variation, of the set.

First, it is determined whether the set is in the pitch varying state. If the set is in the pitch varying state, the pitch angles of the multiple cog belts are acquired, pairwise difference values among the multiple pitch angles are calculated, and it is determined whether there exists a difference value exceeding a threshold from the difference values. If there exists a difference value exceeding the threshold, it is considered that there exists a fatigue cog belt among the two cog belts corresponding to that difference value. After positioning the two cog belts, the pitch angles of the two cog belts are analyzed, thereby determining the fatigue cog belt.

Corresponding to the above method for detecting the fatigue state of the cog belt of the wind power generator set, an apparatus for detecting the fatigue state of the cog belt of the wind power generator set is further provided according to the present disclosure.

Figure 6:
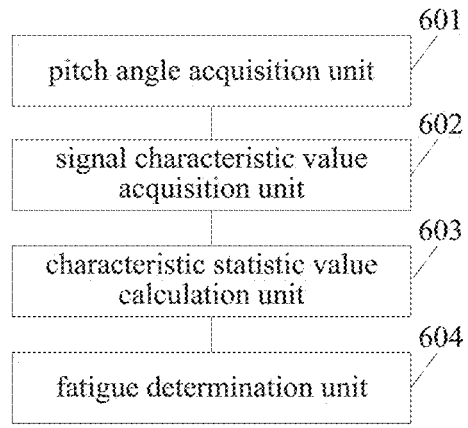
FIG. 6 is a schematic structural diagram of a first embodiment of an apparatus for detecting a fatigue state of a cog belt of a wind power generator set according to the present disclosure.

Shown in FIG. 6 is a structure of a first embodiment of an apparatus for detecting a fatigue state of a cog belt of a wind power generator set. As shown in FIG. 6, the apparatus may include: a pitch angle acquisition unit 601, a signal characteristic value acquisition unit 602, a characteristic statistic value calculation unit 603 and a fatigue determination unit 604.

The pitch angle acquisition unit 601 is configured to acquire pitch angles satisfying a preset condition.

The signal characteristic value acquisition unit 602 is configured to acquire signal characteristic values corresponding to the pitch angles.

The characteristic statistic value calculation unit 603 is configured to select, from the pitch angles, pitch angles at which the signal characteristic value changes, according to an acquisition timing sequence of the signal characteristic values, and perform characteristic statistics on the selected pitch angles to acquire a characteristic statistic value.

The fatigue determination unit 604 is configured to determine whether the cog belt is in the fatigue state, by comparing the characteristic statistic value with a predetermined threshold.

Figure 7:
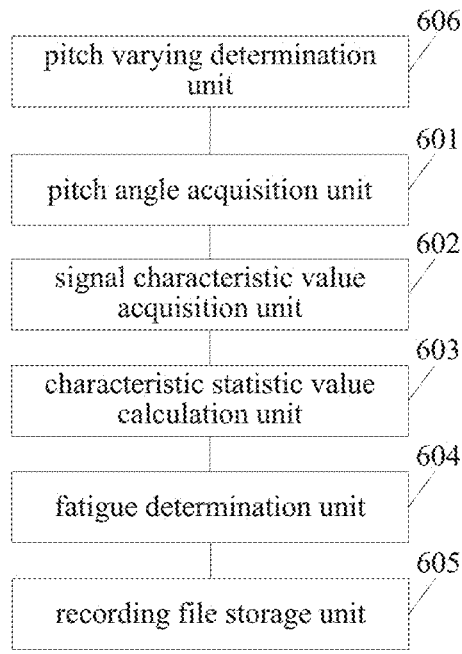
FIG. 7 is a schematic structural diagram of a second embodiment of an apparatus for detecting a fatigue state of a cog belt of a wind power generator set according to the present disclosure.

As shown in FIG. 7, on the basis of the first embodiment of the apparatus for detecting the fatigue state of the cog belt of the wind power generator set, a recording file storage unit 605, and a pitch varying determination unit 606 configured to determine whether the wind power generator set is in a pitch varying state, are further included.

The recording file storage unit 605 is configured to save the corresponding characteristic statistic value and form a recording file, in response to determine that the cog belt is in the fatigue state.

The pitch varying determination unit 606 is configured to determine whether the wind power generator set is in the pitch varying state.

Specifically, a determination manner of the pitch varying determination unit 606 includes determining whether the current pitch angle is larger than a predetermined minimum pitch angle, and in response to a positive determination, determining that the wind power generator set is in the pitch varying state.

In the step of calculating the characteristic static value of the selected pitch angles, the characteristic statistic value calculation unit 606 is configured to calculate a mean value of the selected pitch angles, a standard deviation of the selected pitch angles, or a difference value between a largest value and a smallest value among the selected pitch angles.

Figure 8:
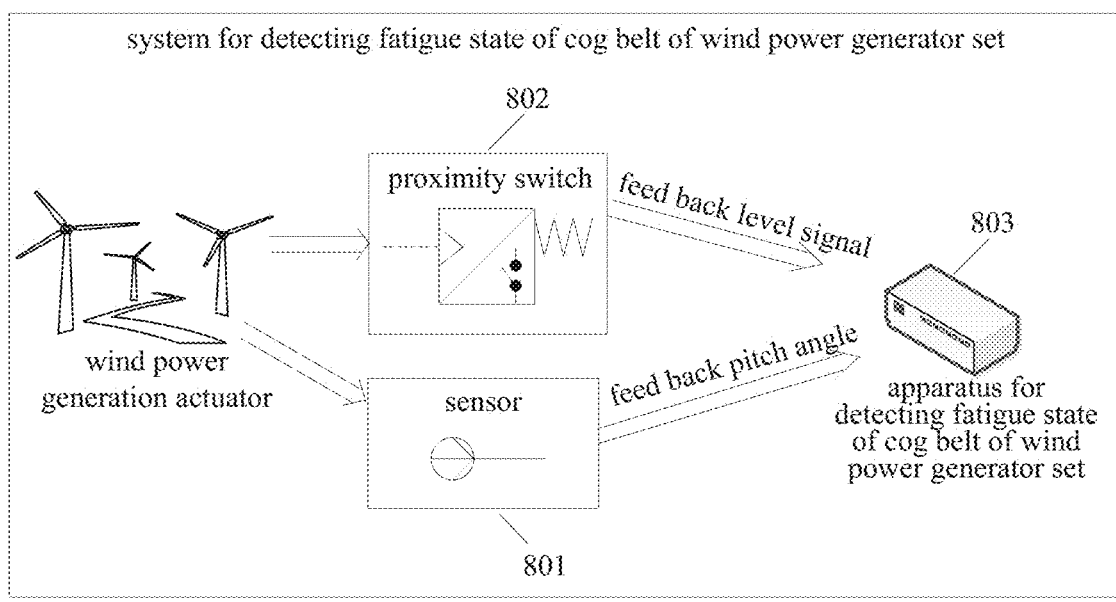
FIG. 8 is a schematic structural diagram of a system for detecting a fatigue state of a cog belt of a wind power generator set according to the present disclosure.

As shown in FIG. 8, a system for detecting the fatigue state of the cog belt of the wind power generator set is further provided according to the present disclosure. The detection system includes: a sensor 801, a proximity switch 802, and the apparatus 803 for detecting the fatigue state of the cog belt of the wind power generator set.

The sensor 801 is configured to send pitch angles detected in real time to the apparatus 803 for detecting the fatigue state of the cog belt of the wind power generator set.

The proximity switch 802 is configured to feed back feedback signals (namely, signal characteristic values) corresponding to the pitch angles satisfying a preset condition, to the apparatus 803 for detecting the fatigue state of the cog belt of the wind power generator set.

In a practical application scene, the sensor 801 is installed on a pitch varying actuator (not shown in FIG. 8) of the wind power generator set, and connected in signals to the apparatus 803 for detecting the fatigue state of the cog belt of the wind power generator set. The pitch varying actuator (such as a pitch varying plate) of the wind power generator set is configured to perform a pitch varying action thereby changing the pitch angle. In performing pitch varying by the wind power generator set, the sensor 801 detects the pitch angle in real time, and sends the pitch angles to the apparatus 803 for detecting the fatigue state of the cog belt of the wind power generator set.

Meanwhile, the proximity switch 802 is also installed on the pitch varying actuator of the wind power generator set, and connected in signals to the apparatus 803 for detecting the fatigue state of the cog belt of the wind power generator set. The proximity switch 802 can sense, in a physical manner, whether the current pitch angle is within a set range of the pitch angle. Once the pitch angle falls within the set range, the proximity switch 802 starts to turn on and feed the feedback signals back to the apparatus 803 for detecting the fatigue state of the cog belt of the wind power generator set.

The apparatus 803 for detecting the fatigue state of the cog belt of the wind power generator set extracts all the pitch angles satisfying the preset condition from the received pitch angles, selects the signal characteristic values respectively corresponding to all the extracted pitch angles; selects the pitch angles at which the signal characteristic value changes, from the extracted pitch angles, according to a timing sequence of acquiring the signal characteristic values, and calculates a characteristic statistic value of the selected pitch angles; and determines whether the cog belt is in the fatigue state, by comparing the characteristic statistic value with a predetermined threshold.

The apparatus 803 for detecting the fatigue state of the cog belt of the wind power generator set may be a controller, and specifically, may be a pitch varying controller, or may be a system main controller.

It should be noted that the embodiments of the present disclosure are described in a progressive manner, and each embodiment places emphasis on the difference from other embodiments. Therefore, one embodiment can refer to other embodiments for the same or similar parts.

It also should be noted that, in the present disclosure, relationship terms such as first and second are only intended to distinguish an entity or an operation from another entity or another operation, and not necessarily require or hint that there is any actual relationship or sequence among these entities or operations. Additionally, terms such as "include", "contain" or any other variant are intended to cover a non-exclusive inclusion. Thereby, a process, a method, an object, or a device including a series of elements not only includes these elements, but also includes other elements not explicitly listed, or also includes inherent elements in the process, the method, the object, or the device. In a case that there is no more limitation, an element limited by words "including a . . . " does not exclude another same element existing in the process, method, object, or device including the element.

The invention claimed is:

1. A method for detecting a fatigue state of a cog belt of a wind power generator set, wherein a proximity switch is set on the wind power generator set and is configured to feed back a signal characteristic value corresponding to a pitch angle of a blade of the wind power generator set, the signal characteristic value having a first level or a second level, the method comprising:
    acquiring pitch angles of the blade of the wind power generator set, and acquiring, from the proximity switch, signal characteristic values corresponding to each of the acquired pitch angles, wherein the acquired pitch angles are within a pitch angle range, wherein the pitch angle range comprises a predetermined pitch angle, and when the cog belt is not in the fatigue state, the proximity switch feeds back a signal characteristic value of the first level if the corresponding pitch angle is greater than the predetermined pitch angle and feeds back a signal characteristic value of the second level if the corresponding pitch angle is not greater than the predetermined pitch angle, the predetermined pitch angle being set according to the wind power generator set;
    selecting, from the acquired pitch angles, pitch angles corresponding to the signal characteristic value which has a level different from a level of a previous signal characteristic value, according to an acquisition timing sequence of the signal characteristic values;
    performing characteristic statistics on the selected pitch angles to acquire a characteristic statistic value, wherein the characteristic statistic value indicates a degree that the selected pitch angles deviate from the predetermined pitch angle; and
    determining that the cog belt is in the fatigue state if the degree indicated by the characteristic statistic value is large than a predetermined threshold.

2. The method for detecting the fatigue state of the cog belt of the wind power generator set according to claim 1, further comprising:
    saving the characteristic statistic value and forming a recording file, in response to the determination that the cog belt is in the fatigue state.

3. The method for detecting the fatigue state of the cog belt of the wind power generator set according to claim 1, further comprising:
    determining whether the wind power generator set is in a pitch varying state before acquiring the pitch angles;
    wherein determining whether the wind power generator set is in the pitch varying state comprises:

determining whether a current pitch angle is greater than a predetermined minimum pitch angle, and in response to a positive determination, determining that the wind power generator set is in the pitch varying state.

4. The method for detecting the fatigue state of the cog belt of the wind power generator set according to claim 1, wherein performing characteristic statistics on the selected pitch angles to acquire the characteristic statistic value, comprises:
calculating a mean value of the selected pitch angles; or
calculating a standard deviation of the selected pitch angles; or
calculating a difference value between a largest value and a smallest value among the selected pitch angles.

5. An apparatus for detecting a fatigue state of a cog belt of a wind power generator set, wherein a proximity switch is set on the wind power generator set and is configured to feed back a signal characteristic value corresponding to a pitch angle of a blade of the wind power generator set, the signal characteristic value having a first level or a second level, the apparatus comprising:
an acquisition unit, configured to acquire pitch angles of the blade of the wind power generator set and acquire, from the proximity switch, signal characteristic values corresponding to each of the acquired pitch angles, wherein the acquired pitch angles are within a pitch angle range, the pitch angle range comprises a predetermined pitch angle, and when the cog belt is not in the fatigue state, the proximity switch feeds back a signal characteristic value of the first level if the corresponding pitch angle is greater than the predetermined pitch angle and feeds back a signal characteristic value of the second level if the corresponding pitch angle is not greater than the predetermined pitch angle, the predetermined pitch angle being set according to the wind power generator set;
a characteristic statistic value calculation unit, configured to select, from the acquired pitch angles, pitch angles corresponding to the signal characteristic value which has a level different from a level of a previous signal characteristic value, according to an acquisition timing sequence of the signal characteristic values, and perform characteristic statistics on the selected pitch angles to acquire a characteristic statistic value, wherein the characteristic statistic value indicates a degree that the selected pitch angles deviate from the predetermined pitch angle; and
a fatigue determination unit, configured to determine that the cog belt is in the fatigue state if the degree indicated by the characteristic statistic value is large than a predetermined threshold.

6. The apparatus for detecting the fatigue state of the cog belt of the wind power generator set according to claim 5, further comprising:
a recording file storage unit, configured to save the characteristic statistic value and form a recording file, in response to the determination that the cog belt is in the fatigue state.

7. The apparatus for detecting the fatigue state of the cog belt of the wind power generator set according to claim 5, further comprising: a pitch varying determination unit, configured to determine whether the wind power generator set is in a pitch varying state;
wherein the pitch varying determination unit is configured to:
determine whether a current pitch angle is greater than a predetermined minimum pitch angle, and in response to a positive determination, determine that the wind power generator set is in the pitch varying state.

8. The apparatus for detecting the fatigue state of the cog belt of the wind power generator set according to claim 5, wherein the characteristic statistic value calculation unit is configured to:
calculate a mean value of the selected pitch angles; or
calculate a standard deviation of the selected pitch angles; or
calculate a difference value between a largest value and a smallest value among the selected pitch angles.

9. A system for detecting a fatigue state of a cog belt of a wind power generator set, comprising: a sensor, the proximity switch and the apparatus for detecting the fatigue state of the cog belt of the wind power generator set according to claim 5, wherein
the sensor is configured to send pitch angles detected in real time to the apparatus for detecting the fatigue state of the cog belt of the wind power generator set according to claim 5; and
the proximity switch is configured to feed back the signal characteristic values corresponding to the pitch angles, to the apparatus for detecting the fatigue state of the cog belt of the wind power generator set according to claim 5.

10. A non-transitory storage medium for detecting a fatigue state of a cog belt of a wind power generator set, wherein the non-transitory storage medium stores computer programs, and the computer programs comprises computer-executable instructions, that when executed by a computer, cause the computer to:
acquire pitch angles of a blade of the wind power generator set and acquire, from a proximity switch set on the wind power generator set, signal characteristic values corresponding to each of the acquired pitch angles, wherein the proximity switch is configured to feed back a signal characteristic value corresponding to a pitch angle of the blade of the wind power generator set, the signal characteristic value has a first level or a second level, the acquired pitch angles are within a pitch angle range, the pitch angle range comprises a predetermined pitch angle, and when the cog belt is not in the fatigue state, the proximity switch feeds back a signal characteristic value of the first level if the corresponding pitch angle is greater than the predetermined pitch angle and feeds back a signal characteristic value of the second level if the corresponding pitch angle is not greater than the predetermined pitch angle, the predetermined pitch angle being set according to the wind power generator set;
select, from the acquired pitch angles, pitch angles corresponding to the signal characteristic value which has a level different from a level of a previous signal characteristic value according to an acquisition timing sequence of the signal characteristic values;
perform characteristic statistics on the selected pitch angles to acquire a characteristic statistic value, wherein the characteristic statistic value indicates a degree that the selected pitch angles deviate from the predetermined pitch angle; and
determine that the cog belt is in the fatigue state if the degree indicated by the characteristic statistic value is large than a predetermined threshold.

11. The non-transitory storage medium according to claim 10, further comprising instructions that cause the computer to:

save the characteristic statistic value and forming a recording file, in response to determine that the cog belt is in the fatigue state.

12. The non-transitory storage medium according to claim 10, further comprising instructions that cause the computer to:
determine whether the wind power generator set is in a pitch varying state;
wherein determining whether the wind power generator set is in the pitch varying state comprises:
determining whether a current pitch angle is greater than a predetermined minimum pitch angle, and in response to a positive determination, determining that the wind power generator set is in the pitch varying state.

13. The non-transitory storage medium according to claim 10, wherein performing characteristic statistics on the selected pitch angles to acquire the characteristic statistic value, comprises:
calculating a mean value of the selected pitch angles; or
calculating a standard deviation of the selected pitch angles; or
calculating a difference value between a largest value and a smallest value among the selected pitch angles.

\* \* \* \* \*